Figure 7:
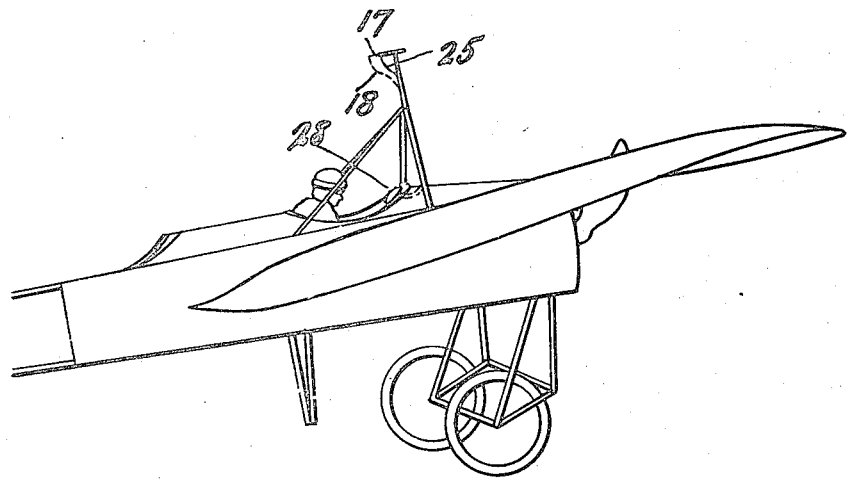

A. OGILVIE.
ANEMOMETER.
APPLICATION FILED JUNE 1, 1914.
1,146,202.
Patented July 13, 1915.
3 SHEETS—SHEET 1.
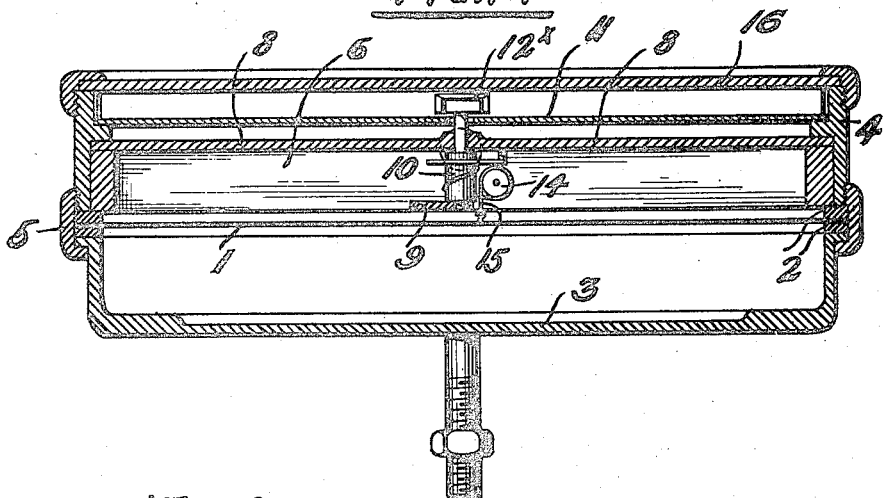
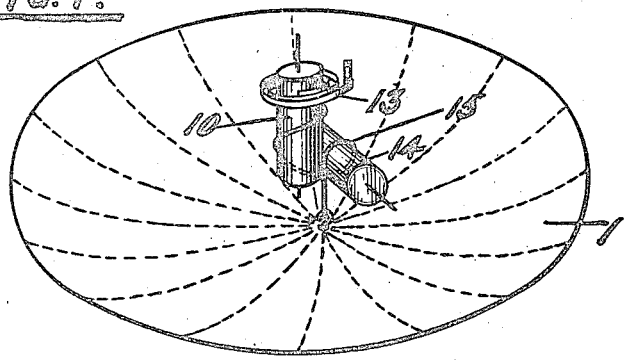
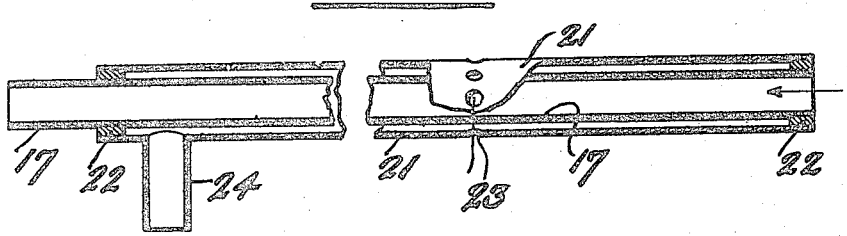
Witnesses:
Inventor:
Alex Ogilvie
By his attorney A. OGILVIE.
ANEMOMETER.
APPLICATION FILED JUNE 1, 1914.
1,146,202.
Patented July 13, 1915.
3 SHEETS—SHEET 2.
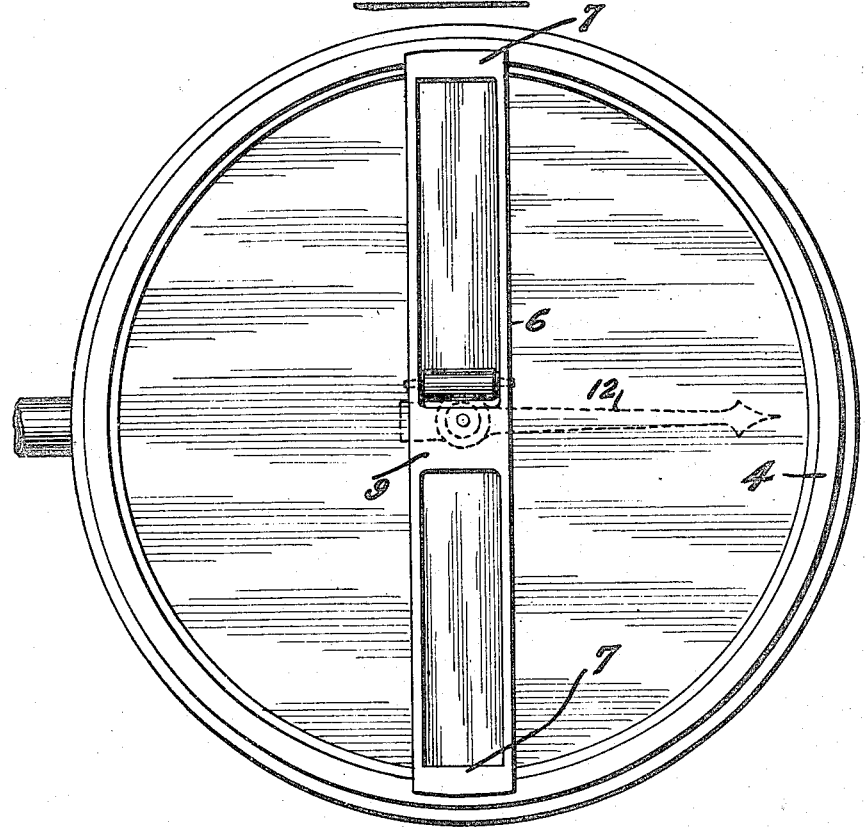
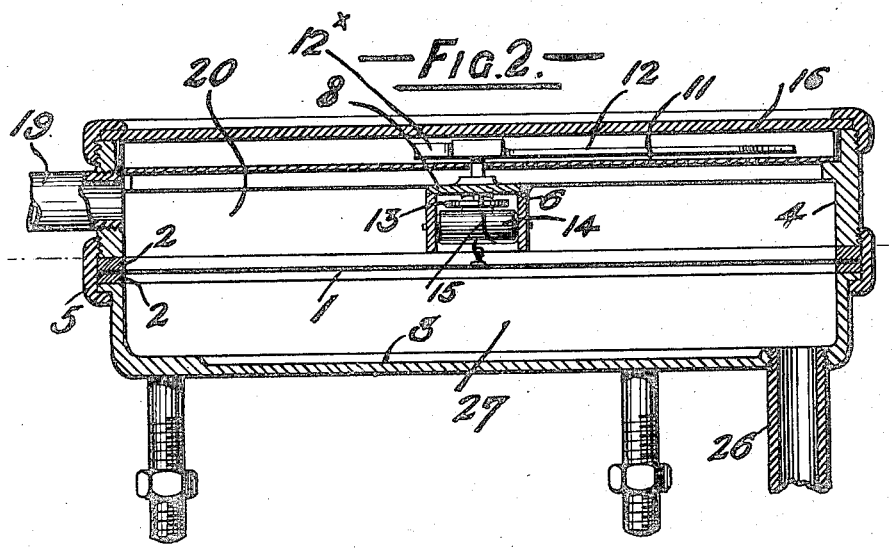

A. OGILVIE.
ANEMOMETER.
APPLICATION FILED JUNE 1, 1914.

1,146,202.

Patented July 13, 1915.
3 SHEETS—SHEET 3.

UNITED STATES PATENT OFFICE.

ALEC OGILVIE, OF EASTCHURCH, SHEPPEY, ENGLAND.

ANEMOMETER.

1,146,202.

Specification of Letters Patent.

Patented July 13, 1915.

Application filed June 1, 1914. Serial No. 842,179.

*To all whom it may concern:*

Be it known that I, ALEC OGILVIE, subject of the King of Great Britain, residing at Eastchurch, Sheppey, in the county of Kent, England, have invented certain new and useful Improvements in Anemometers, and of which the following is a specification.

This invention relates to anemometers, and the object of the said invention is to enable the pressure of fluid received in a tube or through an aperture, to be indicated on an approximately evenly divided scale, not graduated in proportion with the actual pressure, but in graduations corresponding to the relative speed of travel of the air impinging on the entrance to the tube.

It is well known that the pressure of air received by a nozzle or tube, the open end of which is directed against the flow of air, increases as the square of the speed of travel of the said air. If therefore an instrument be made with an indicator moving in proportion to the variations of pressure, and the dial be graduated to show the variations of speed of travel of the air due to such variations of pressure, then as the speeds vary, the extent of movement of the indicator relatively to the extent of change in the speed of the air, is much greater for changes at higher speeds than for similar changes at lower speeds.

Varying distances of movement of the indicating mechanism to indicate regular changes of speed of the traveling air, render such indicating mechanism extremely unsatisfactory in use, especially for quick readings on aeroplane flying machines. It is therefore eminently desirable in instruments for indicating speed of travel of air or of a flying machine through air, for the dial to be graduated in even divisions and for the hand or indicator to move a distance equal in proportion to the change of speed of the air or machine.

According to this invention, the tube which receives the pressure of the air, communicates with indicating or recording mechanism, the latter being so designed as to produce a movement of the indicator on the scale, approximately proportional to the square root of the pressure, and this reduction in movement upon increase of pressure taking place, balances, or partly compensates for the accelerated increase in pressure in proportion as the speed of the air becomes greater. This result is obtained by the employment of an elastic diaphragm which offers greater resistance to movement in proportion as it becomes expanded or inflated, and the center or other convenient portion of the said diaphragm is connected by suitable mechanism with an indicator moving over an evenly or approximately evenly graduated scale. The atmospheric pressure in the entrance to the tube is transmitted through the said tube to a closed chamber of which the diaphragm forms one of the walls while the opposite side of the diaphragm is subject to atmospheric pressure, or to pressure received in any orifice or orifices which receive pressure, or through which suction takes place, in accordance with the speed of flow of the fluid, and consequently in proportion to the square of the speed of the tube through the air or of the air traveling past the said entrance, so the pressure in the pressure chamber increases or decreases. At the lower speeds, the pressure varies to a comparatively small extent, and at the lower pressure the diaphragm is correspondingly easy in its movements, but as the pressure increases owing to the greater speeds attained, the diaphragm, becoming more extended, moves to a less extent in proportion to increases in pressure.

The operation of the instrument is based upon the fact that a uniform elastic diaphragm such as that employed, assumes an approximately spherical form when acted on by a uniform pressure, and the deflection of the center of the diaphragm is then proportional to the square root of the pressure acting. This movement of the center of the diaphragm being proportional to the square root of the pressure, compensates for the pressure received in the instrument increasing as the square of the speed of the traveling air being measured. Thus an evenly divided scale can be employed in the instrument constructed according to this invention.

The invention will now be described with reference to the accompanying drawings.

Figure 5:
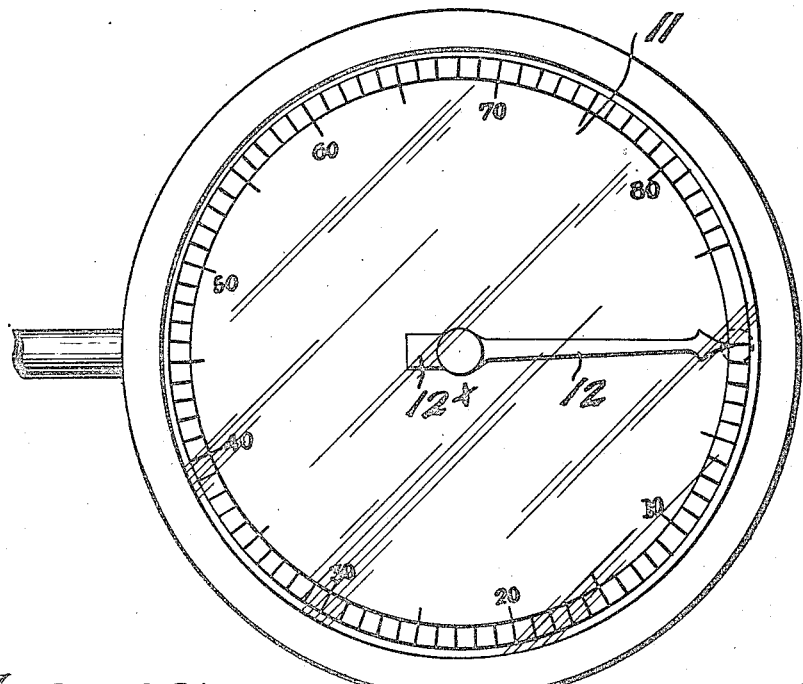

Figure 1 shows in vertical longitudinal section an anemometer constructed according to this invention, and Fig. 2 is a vertical section taken at right angles to the plane of section of Fig. 1. Fig. 3 is an inverted plan view with the base and diaphragm removed. Fig. 4 shows in perspective the diaphragm detached from the apparatus and in the position it assumes when subjected to pressure, while the means by which the diaphragm is connected so as to operate the indicating finger is also shown. Fig. 5 is a plan view of the apparatus drawn to a smaller scale than the previous figures showing the dial. Fig. 6 shows in partial vertical section an example of construction of a tube for receiving the wind pressure. Fig. 7 indicates a portion of a flying machine showing a position in which the apparatus according to this invention may be placed.

Referring more particularly to Figs. 1 and 2, the elastic diaphragm 1, which may be composed of india rubber or other elastic material, is firmly cemented or clamped at its edges preferably being first slightly stretched, between two rings 2, which latter are located between the flanged edges of a circular box-like base 3 and the lower edge of a ring 4, the two members 3 and 4 being, in the construction shown, held together by the clamping ring 5, and the parts 2, 3, 4 and 5 may be composed of metal.

Extending diametrically across the interior of the ring 4 is a frame 6, the ends 7 of which, as indicated at Fig. 3, enter recesses formed in the ring 4, and the frame 6 is fitted with a top cover 8 and is formed with a lower cross bar 9, Figs. 1 and 3. The frame supports the pivots of a vertical roller 10, Fig. 1, the said pivots having bearings respectively in the cross bar 9 and in the cover 8 of the frame 6, and the upper pivot extends through a dial 11 supported by an annular flange on the ring 4, and above the dial 11 the pivot of the roller 10 carries an indicating finger 12, see also Figs. 2 and 5. The indicating finger 12 is balanced, as by the extension $12^x$, and it is particularly important that it should be correctly balanced when the anemometer is intended for use in an aeroplane flying machine; when so used and when the indicating finger is correctly balanced, the instrument is practically unaffected by gravity. The importance of this quality in instruments for this purpose is very great, since they are fitted with a view to warning the pilot of loss of flying velocity, and instruments dependent solely on gravity for their control are affected by the partial falling of the aeroplane consequent on loss of flying speed in such a manner that their readings remain on the whole unaffected, and so fail to discharge their function, while instruments partly controlled by gravity are in like manner partially affected.

The dial 11 is evenly or approximately evenly graduated through nearly the complete circumference as shown at Fig. 5, but it will be understood that the dial might be graduated to allow for the finger 12 making more than a complete revolution.

The vertical roller 10 passes through and is connected to one end of a volute spring 13, Figs. 1 and 2, the opposite end of the spring being connected to a stud on the frame cover 8, so arranged that the spring normally carries the indicating finger 12 to its zero position. It is convenient to adjust the volute spring to a slight initial tension.

Carried by pivots supported in the frame 6, is a horizontal roller 14 having its periphery adjacent to the periphery of the vertical roller 10, and a cord 15 is attached at one end approximately at the center of the elastic diaphragm 1, and extends vertically upward, adjacent to the periphery of the vertical roller 10, and passes around the horizontal roller 14 and then around the vertical roller 10, to which the other end of the cord 15 is fixed. The upper part of the case composed by the ring 4 is covered with a transparent air-tight cover 16.

The general arrangement of the rollers 10 and 14 can be very readily understood by the perspective view at Fig. 4 which also indicates the volute spring 13, the diaphragm in this case being shown depressed, that is in the position it assumes when subjected to air pressure.

It has already been stated that one side of the diaphragm is acted upon by the pressure transmitted through the tube to the closed chamber, and in the construction described with reference to the drawings, the opposite side of the diaphragm forms a wall of the circular box-like base 3. At Fig. 6 of the drawings is shown a double tube of the combined "Pitot" and static pressure type, the inner tube 17 of which is held in a position to receive the air pressure, and is connected with the closed chamber 20 formed in the casing of the apparatus between the transparent cover 16 and the diaphragm 1, while the outer tube 21 is connected with the chamber below the diaphragm.

Referring to Fig. 6 the central tube 17 is held in a position to receive the air pressure entering in the direction indicated by the arrow, and which may be termed the forward end of the tube, and the rear end of the tube 17 is connected by a flexible or other pipe 18, Fig. 7, with a nozzle 19 opening into the chamber 20.

The tube 17, Fig. 6, is surrounded by the outer tube 21, there being an annular space between the exterior of the tube 17 and the interior of the tube 21, which annular space is closed at its ends by rings 22. Apertures 23, Fig. 6, are formed through the wall of the outer tube 21 at a distance from the forward end thereof, and a nozzle 24 is provided, communicating with the annular space within the tube 21, so that while pressure passes into the tube 17 and so to the chamber 20 of the apparatus, atmospheric pressure is maintained on the opposite side of the diaphragm by the nozzle 24, Fig. 6, being connected by a flexible or other tube, such as 25 Fig. 7, with a nozzle 26, Fig. 2, communicating with the chamber 27 formed by the box-like base 3 and the elastic diaphragm 1.

When the anemometer is applied, as in the example shown at Fig. 7, to a flying machine, the tube 17, Fig. 6, is supported in a position with its open end facing the direction of travel of the machine, and the instrument described with reference to Figs. 1 to 6 is arranged, as indicated at 28 Fig. 7, so that the dial can readily be observed by the pilot. When the machine is in motion, pressure will be conveyed to the chamber 20, Figs. 1 and 2, of the apparatus, while simultaneously the chamber 27 beneath the elastic diaphragm 1 may be maintained at atmospheric pressure, and thus the diaphragm will be extended in a downward direction, and the indicating finger 12 will be moved. The elastic diaphragm 1 offers greater resistance to movement in proportion as it becomes expanded or inflated, and therefore the indicating finger 12 is moved over the evenly graduated scale, as indicated at Fig. 5.

Where the apparatus is employed for measuring wind speed at a fixed station, the instrument can conveniently be connected to any well known type of swiveling wind tube.

What I claim as my invention and desire to secure by Letters Patent is:—

1. An anemometer or air speed indicator comprising in combination: a box-like case, a transparent plate hermetically closing one end of said case, an elastic diaphragm adapted to dilate under pressure arranged parallel with said plate and dividing said case into two compartments, a tube communicating at one end with one compartment and open at its other end to receive the flow of air the speed of which is to be measured, means to maintain the other compartment at atmospheric pressure, an approximately evenly divided dial, a spindle rotatably mounted within said case, an indicating finger on said spindle, a positive connection between said spindle and diaphragm adapted to communicate angular movement to said finger with respect to said dial in a regular progression proportionate to the movement of the diaphragm when said diaphragm is distended by air pressure due to its velocity, and means to return said finger toward its original position on said dial as the pressure on said diaphragm becomes reduced.

2. An anemometer or air speed indicator comprising in combination: a box-like case, a transparent plate hermetically closing one end of said case, an elastic diaphragm adapted to dilate under pressure arranged parallel with said plate and dividing said case into two compartments, an open-ended tube communicating at one end through a passage in said case with the interior of one compartment the other end of the tube being arranged to receive the flow of air the speed of which is to be measured, a second tube communicating at one end through a passage in said case with the interior of the other compartment, the other end of said tube communicating with the atmosphere and located in such a position that the pressure of the air within said tube and therefore in said compartment is uninfluenced by any relative movement of air surrounding said tube, an approximately evenly divided dial, a spindle rotatably mounted within said case, an indicating finger on said spindle, a positive connection between said spindle and diaphragm adapted to communicate angular movement to said finger with respect to said dial in a regular progression proportionate to the movement of the diaphragm when said diaphragm is distended by air under pressure due to its velocity, and means adapted to return said finger toward its original position on said dial as the pressure on said diaphragm becomes reduced.

3. An anemometer or air speed indicator comprising in combination: a box-like case, a transparent plate hermetically closing one end of said case, an elastic diaphragm adapted to dilate under pressure arranged parallel with said plate and dividing said case into two compartments, an open-ended tube communicating at one end with the compartment of said case between said plate and diaphragm, the other end of said tube being located to receive air under pressure in accordance with the speed of its flow, an approximately evenly divided dial in said compartment, a frame extending across said compartment, a spindle rotatably carried by said frame, a balanced indicating finger on said spindle, a positive connection between said spindle and diaphragm adapted to communicate angular movement to said finger with respect to said dial in a regular progression proportionate to the movement of the diaphragm when said diaphragm is distended, means to maintain the other compartment at atmospheric pressure and a spring fixed at one end to said spindle and at the other end to said frame to gradually return said finger to its original position on said dial as the pressure on said diaphragm becomes reduced.

4. An anemometer or air speed indicator comprising in combination: an open-ended box-like case, a transparent plate hermetically closing one end of said case, an elastic diaphragm adapted to dilate under pressure and to close the other end of said case, means for fixing said diaphragm to said case, a tube to communicate at one end with the interior of said case and open at its other end to receive the flow of air the speed of which is to be measured, an approximately evenly divided dial, a spindle rotatably carried in said case, a finger fixed to said spindle, a positive connection between said spindle and said diaphragm to impart angular movement to said finger with respect to said dial in a regular progression proportionate to the movement of the diaphragm when the diaphragm is distended by pressure of air in said case, means to return said finger toward its original position as the pressure on said diaphragm becomes reduced, an open box-like base, means for fixing and clamping the edges of said base to the edges of said diaphragm to form a chamber at the rear of said diaphragm, and an open-ended tube one end of which communicates with said chamber the other end of said tube being so arranged as to preserve a static pressure within said chamber.

5. An anemometer or air speed indicator comprising in combination: a box-like case, a transparent plate hermetically closing one end of said case, an elastic diaphragm adapted to dilate under pressure arranged parallel with said plate and dividing said case into two compartments, an open-ended tube communicating at one end with the compartment of said case between said plate and diaphragm the other end of said tube being arranged to receive the flow of air the speed of which is to be measured, an approximately evenly divided dial in said compartment, a frame extending across said compartment, a spindle rotatably carried by said frame, an indicating finger on said spindle, a roller surrounding and fixed to said spindle, a second roller carried by said frame revoluble about an axis at right angles to said spindle, a cord connected at one end at about the center of said diaphragm and extending around said second and first rollers and having its opposite end fixed to said first roller so that when said diaphragm is distended said finger is caused to move around said dial to an extent corresponding to the dilation of the diaphragm, a spring fixed at one end to said spindle and at the other end to said frame to return said finger toward its original position on said dial as pressure on said diaphragm becomes reduced, a tube communicating at one end with the interior of said compartment its other end being located to receive the flow of air the speed of which is to be measured, and an open-ended tube one end of which communicates with the interior of the other compartment of said case the other end of said tube being so arranged as to preserve the static pressure within the said chamber.

6. An anemometer or air speed indicator comprising in combination: a box-like case, a transparent plate hermetically closing one end of said case, an elastic diaphragm adapted to dilate under pressure arranged parallel with said plate and dividing said case into two compartments, an approximately evenly divided dial, a spindle rotatably mounted within said case, an indicating finger on said spindle, a positive connection between said spindle and diaphragm adapted to communicate angular movement to said finger with respect to said dial in regular progression proportionate to the movement of the diaphragm due to the variation of pressure in one of said compartments, a double tube of the combined "Pitot" and static pressure tube type located in a position to receive the flow of air, the speed of which is to be measured, a tube connecting the delivery end of the inner tube of said "Pitot" and static pressure tubes with the interior of the compartment between the diaphragm and said transparent plate to convey said pressure to said compartment, and a tube connecting the outer static pressure tube to the other compartment substantially as set forth.

In witness whereof I have hereunto set my hand in the presence of two witnesses.

ALEC OGILVIE.

Witnesses:
GRIFFITH BREWER,
WILLIAM A. MARSHALL.